United States Patent
Colenbrander

(10) Patent No.: US 11,074,666 B2
(45) Date of Patent: Jul. 27, 2021

(54) SCALABLE GAME CONSOLE CPU/GPU DESIGN FOR HOME CONSOLE AND CLOUD GAMING

(71) Applicant: Sony Interactive Entertainment LLC, San Mateo, CA (US)

(72) Inventor: Roelof Roderick Colenbrander, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/261,986

(22) Filed: Jan. 30, 2019

(65) Prior Publication Data

US 2020/0242723 A1    Jul. 30, 2020

(51) Int. Cl.
   | | |
   |---|---|
   | G09G 5/36 | (2006.01) |
   | G06T 1/60 | (2006.01) |
   | G06T 1/20 | (2006.01) |
   | A63F 13/355 | (2014.01) |

(52) U.S. Cl.
   CPC .............. *G06T 1/20* (2013.01); *A63F 13/355* (2014.09); *G06T 1/60* (2013.01); *G09G 5/363* (2013.01)

(58) Field of Classification Search
   CPC ......... G06T 1/20; G06T 1/60; G06T 2210/52; G09G 5/363; A63F 13/355; G06F 3/1438
   USPC ........ 345/501, 502, 505, 536, 539, 545, 547
   See application file for complete search history.

(56) References Cited

U.S. PATENT DOCUMENTS

| | | | |
|---|---|---|---|
| 6,956,579 B1* | 10/2005 | Diard | G06F 12/0284 345/502 |
| 7,015,915 B1* | 3/2006 | Diard | G06F 15/8007 345/505 |
| 7,075,541 B2* | 7/2006 | Diard | G06T 15/005 345/502 |
| 7,456,833 B1* | 11/2008 | Diard | G06T 11/206 345/440 |
| 7,522,167 B1* | 4/2009 | Diard | G06T 15/005 345/502 |
| 7,525,548 B2* | 4/2009 | Azar | G06F 3/14 345/502 |
| 7,633,505 B1* | 12/2009 | Kelleher | G06T 1/20 345/502 |
| 7,786,998 B2* | 8/2010 | Law | H04N 5/915 345/502 |
| 7,941,645 B1* | 5/2011 | Riach | G06T 1/20 712/220 |
| 2007/0013702 A1* | 1/2007 | Hiroi | G06T 1/20 345/502 |
| 2008/0030507 A1* | 2/2008 | Herz | G06T 15/005 345/502 |
| 2014/0132611 A1* | 5/2014 | Chen | G06F 13/1663 345/502 |
| 2015/0339171 A1* | 11/2015 | Andonieh | G06F 9/5083 345/505 |

(Continued)

*Primary Examiner* — Jacinta M Crawford
(74) *Attorney, Agent, or Firm* — John L. Rogitz

(57) ABSTRACT

In a multi-GPU simulation environment, frame buffer management may be implemented by multiple GPUs rendering respective frames of video, or by rendering respective portions of each frame of video. One of the GPUs controls HDMI frame output by virtue of receiving frame information from the other GPU(s) and reading out complete frames through a physically connected HDMI output port. Or, the outputs of the GPUs can be multiplexed together.

15 Claims, 7 Drawing Sheets

(56) References Cited

U.S. PATENT DOCUMENTS

2016/0188351 A1* 6/2016 Andress .............. G06F 9/45508
 713/100
2017/0185514 A1* 6/2017 Blinzer ............... G06F 12/0815
2019/0265776 A1* 8/2019 Montero ............... G06F 1/3296

* cited by examiner

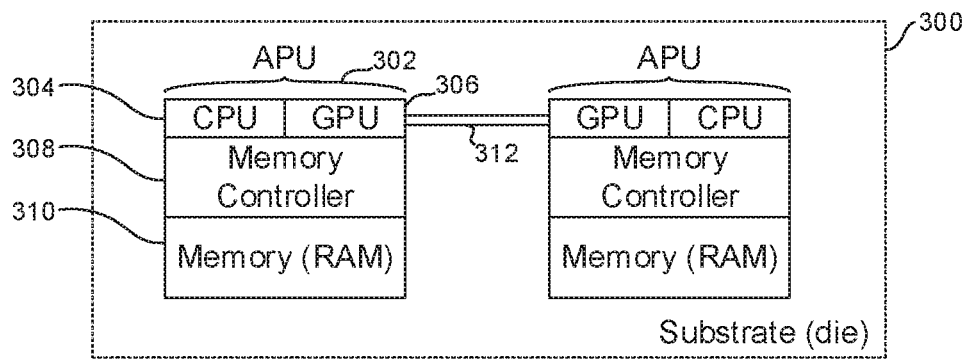
FIG. 3   Non-uniform memory access
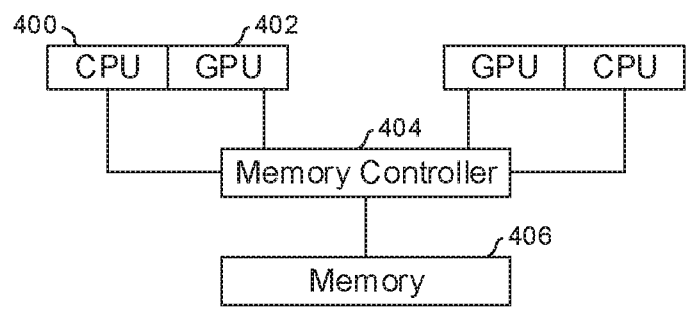
FIG. 4   Separate dies – all processors
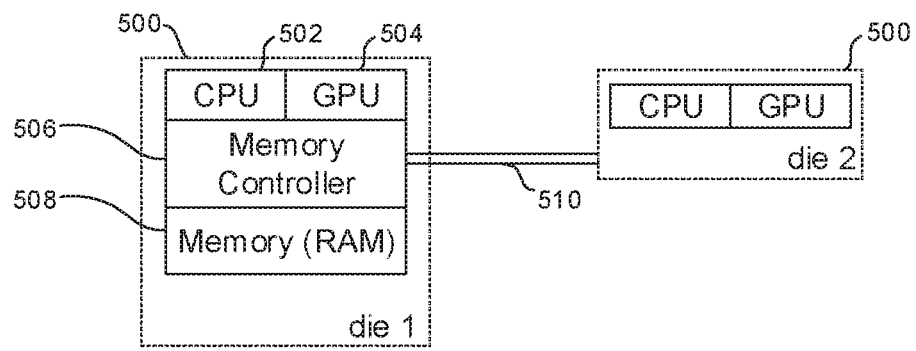
FIG. 5   Extra die with extra APU

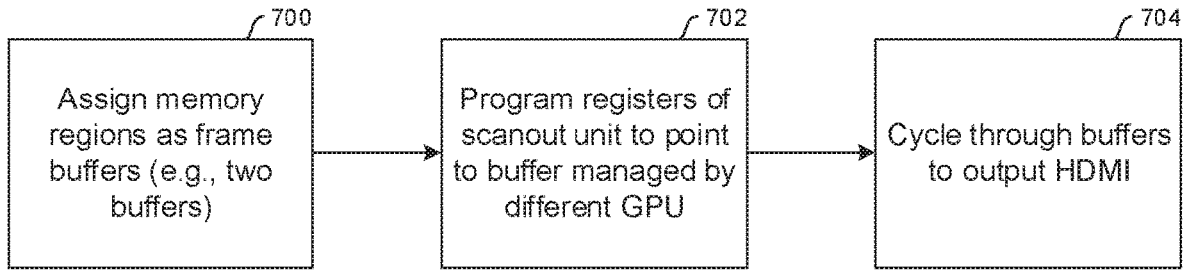
FIG. 7  NUMA technique A – GPUs render different frames
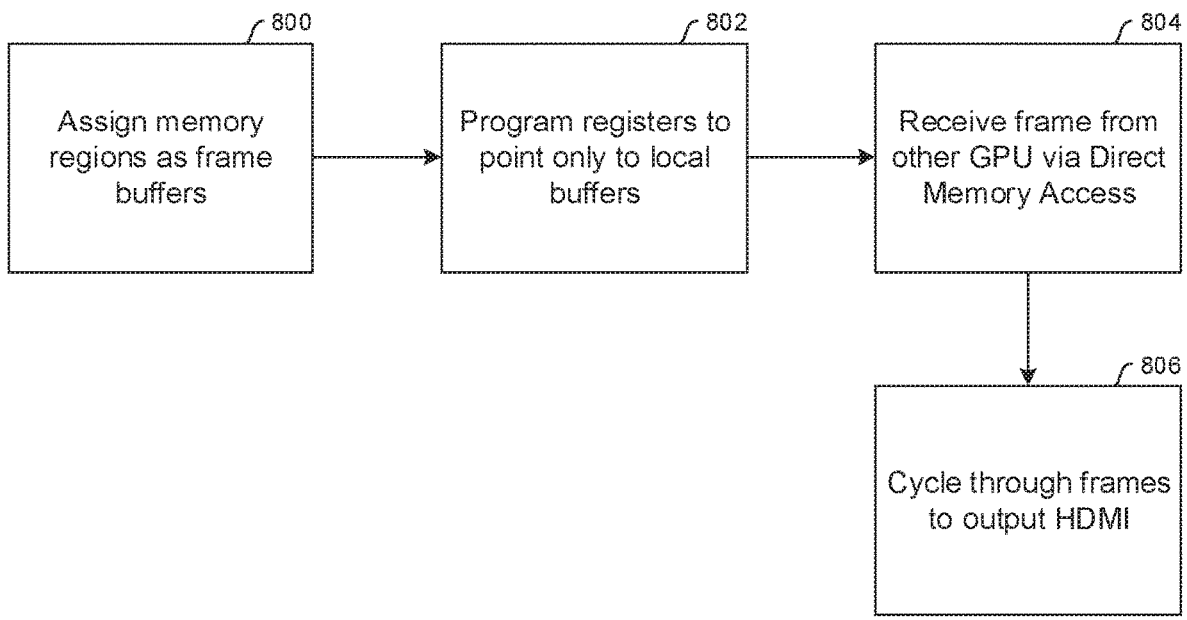
FIG. 8  NUMA technique B – GPUs render different frames

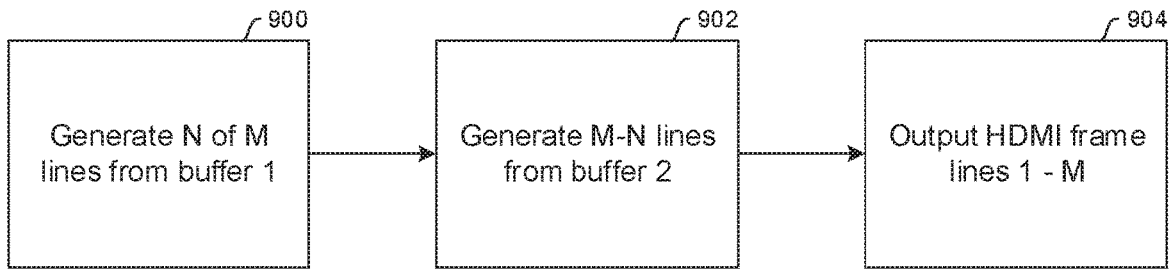
FIG. 9  GPUs render different portions of each frame (NUMA technique 1)
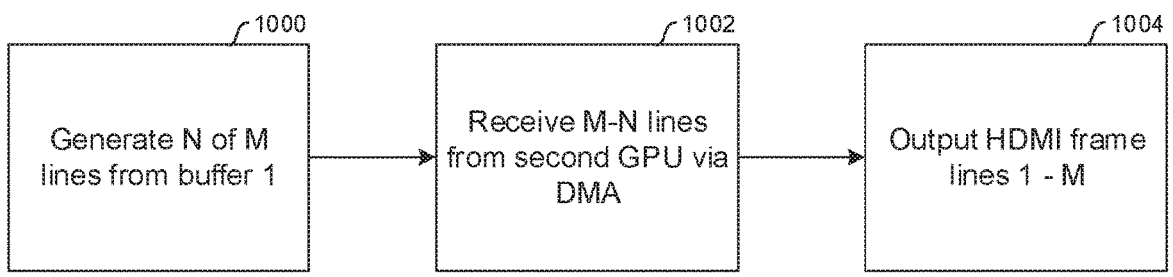
FIG. 10  GPUs render different portions of each frame (NUMA technique 2)
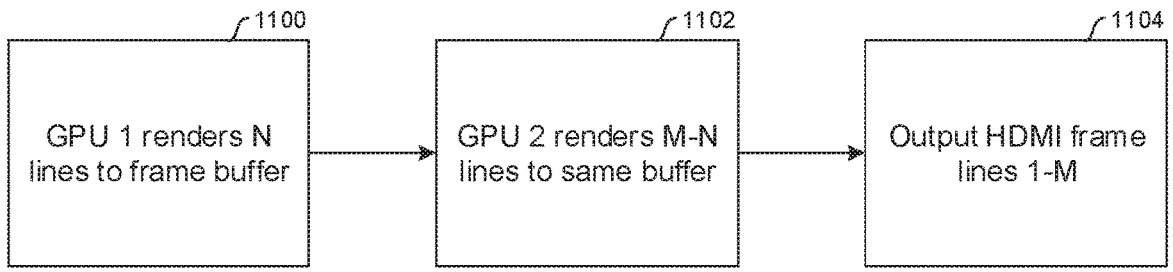
FIG. 11  GPUs render different portions of each frame (shared memory controller)

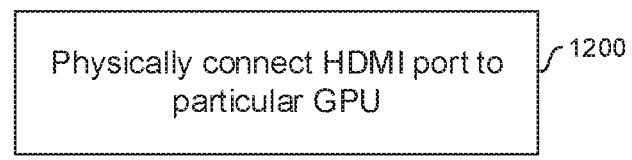
FIG. 12  Which GPU controls HDMI output (technique 1)
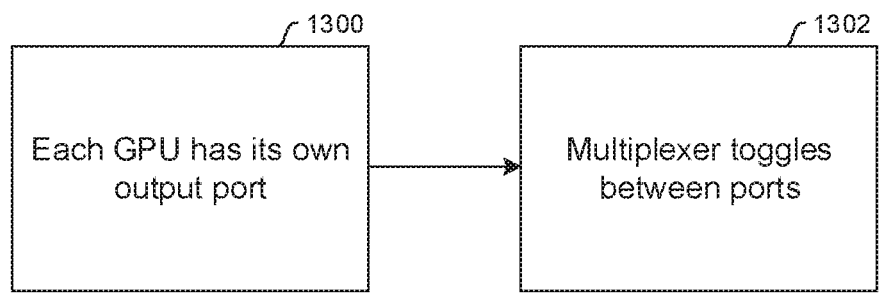
FIG. 13  Which GPU controls HDMI output (technique 2)
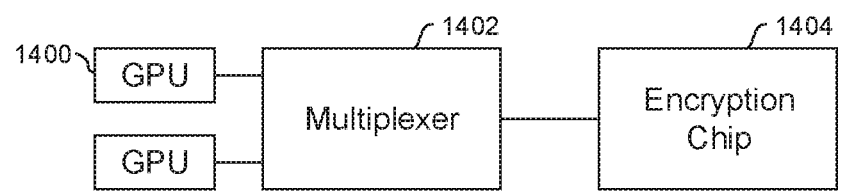
FIG. 14

… (1)

SCALABLE GAME CONSOLE CPU/GPU DESIGN FOR HOME CONSOLE AND CLOUD GAMING

FIELD

The application relates generally to scalable game console CPU/GPU designs for home consoles and cloud gaming.

BACKGROUND

Simulation consoles such as computer game consoles typically use a single chip, referred to as a "system on a chip" (SoC) that contains a central processing unit (CPU) and a graphics processing unit (GPU). Due to semiconductor scaling challenges and yield issues, multiple small chips can be linked by high-speed coherent busses to form big chips. While such a scaling solution is slightly less optimal in performance compared to building a huge monolithic chip, it is less costly.

SUMMARY

As understood herein, SoC technology can be applied to video simulation consoles such as game consoles, and in particular a single SoC may be provided for a "light" version of the console while plural SoCs may be used to provide a "high-end" version of the console with greater processing and storage capability than the "light" version. The "high end" system can also contain more memory such as random-access memory (RAM) and other features and may also be used for a cloud-optimized version using the same game console chip with more performance.

As further understood herein, however, such a "high end" multiple SoC design poses challenges to the software and simulation (game) design, which must scale accordingly. As an example, challenges arise related to non-uniform memory access (NUMA) and thread management, as well as providing hints to software to use the hardware in the best way. In the case of GPUs working in concert, the framebuffer management and control of high definition multimedia (HDMI) output may be addressed. Other challenges as well may be addressed herein.

Accordingly, an apparatus includes at least a first graphics processing unit (GPU), and at least a second GPU communicatively coupled to the first GPU. The GPUs are programmed to render respective portions of video, such that the first GPU renders first portions of video and the second GPU renders second portions of the video, with the first and second portions being different from each other.

Stated differently, the first GPU may be programmed for rendering first frames of video to provide a first output, while the second GPU is programmed rendering some, but not all, frames of the video to provide a second output. The frames rendered by the second GPU are different from the frames rendered by the first GPU. The first and second outputs may be combined to render the video. In addition, or alternatively, the first GPU may be programmed for rendering all of some, but not all, lines of a frame of video to provide a first line output and the second GPU may be programmed for rendering some, but not all, lines of the frame of the video to provide a second line output. The lines rendered by the second GPU are different from the lines rendered by the first GPU. The first- and second-line outputs can be combined to render the frame.

In some embodiments, the first and second GPUs are implemented on a common die. In other embodiments, the first and second GPUs are implemented on respective first and second dies. The first GPU may be associated with a first central processing unit (CPU) and the second GPU may be associated with a second CPU.

In some implementations, a first memory controller and first memory are associated with the first GPU and a second memory controller and second memory are associated with the second GPU. In other implementations, the GPUs share a common memory controller controlling a common memory.

In some examples, each GPU is programmed to render all of some, but not all, frames of video different from frames of the video rendered by the other GPU to provide a respective output. The outputs of the GPUs can be combined to render the video. In other examples, each GPU is programmed to render all of some, but not all, lines of a frame of video, with lines of a frame of video rendered by a GPU being different from lines of the frame rendered by the other GPU to provide a respective output. The outputs of the GPUs can be combined to render the video.

In an example technique, the first GPU includes at least one scanout unit pointing to at least one buffer managed by the second GPU. The first GPU can be programmed to cycle through buffers to output a complete sequence of frames of the video. In another example, the first GPU includes at least one scanout unit pointing only to buffers managed by the first GPU and is programmed to receive frames of the video from the second GPU via direct memory access (DMA) to output a complete sequence of frames of the video.

In yet another example technique, the first GPU includes at least one scanout unit pointing to at least a first buffer managed by the first GPU and a second buffer managed by the second GPU. In this technique, the first GPU is programmed to cycle through buffers to output a complete sequence of frame of video using 1-N lines associated with the first buffer and (N+1)-M lines associated with the second buffer. The 1-N lines are different lines of the same frame associated with the (N+)-M lines.

Yet again, the first GPU can include at least one scanout unit pointing to at least a first buffer managed by the first GPU and not to a second buffer managed by the second GPU. In this implementation, the first GPU may be programmed to cycle through buffers to output a complete sequence of frame of video using 1-N lines associated with the first buffer and (N+1)-M lines associated with the second buffer and received by the first GPU via direct memory access (DMA). The 1-N lines and (N+1)-M lines are different lines of the frame of video.

In still another technique, the first GPU includes at least one scanout unit pointing to at least a first buffer communicating with the common memory controller. The second GPU includes a second buffer communicating with the common memory controller. The first GPU is programmed for rendering 1-N lines associated with the first buffer and the second GPU is programmed for rendering (N+1)-M lines associated with the second buffer.

In some examples, the first GPU manages video data output from the first and second GPUs. This may be affected by physically connecting a HDMI port to the first GPU. In other examples, the GPUs output video data to a multiplexer that multiplexes the frames and/or lines from the respective GPUs together to output video.

In another aspect, in a multi-graphics processing unit (GPU) simulation environment, a method includes causing plural GPUs to render respective frames of video, or to render respective portions of each frame of video, or both to render respective frames and respective portions of frames of video. The method includes controlling frame output using a first one of the GPUs receiving frame information from at least one other of the GPU(s), or multiplexing outputs of the GPUs together, or both using a first one of the GPUs receiving frame information from at least one other of the GPU(s) and multiplexing outputs of the GPUs together.

In another aspect, a computer simulation apparatus includes at least a first graphics processing unit (GPU) programmed for rendering a respective first portion of simulation video, and at least a second GPU programmed for rendering a respective second portion of simulation video. At least the first GPU is programmed to combine the first and second portions and to render an output establishing a complete simulation video.

The details of the present application, both as to its structure and operation, can best be understood in reference to the accompanying drawings, in which like reference numerals refer to like parts, and in which:

BRIEF DESCRIPTION OF THE DRAWINGS

FIG. 3 is a block diagram of an example non-uniform memory access (NUMA) architecture, in which two APUs are shown on a single fabric, it being understood that the NUMA architecture may be implemented by APUs on separate fabrics and that more than two APUs may be implemented:

FIG. 4 is a block diagram of a shared memory architecture in which two APUs are shown with each processor being implemented on its own respective die, it being understood that the architecture may be implemented on fewer or even one die and that more than two APUs may be implemented;

FIG. 5 is a block diagram of a shared memory architecture in which two APUs are shown with each APU being implemented on its own respective fabric and with the shared memory controller being implemented on one of the fabrics, it being understood that the architecture may be implemented on one fabric and that more than two APUs may be implemented on one or more dies;

FIG. 7 is a flow chart of example logic of a NUMA embodiment in which each GPU renders complete frames with each GPU rendering different frames of the same video than the other GPU, with one of the GPUs having registers pointing to buffers of the other GPU(s):

FIG. 8 is a flow chart of example logic of a NUMA embodiment in which each GPU renders complete frames with each GPU rendering different frames of the same video than the other GPU, with one of the GPUs receiving frames via DMA from the other GPU(s):

FIG. 9 is a flow chart of example logic of a NUMA embodiment in which each GPU renders portions (e.g., lines) of frames with each GPU rendering different portions of the same frame than the other GPU;

FIG. 10 is a flow chart of example logic of a NUMA embodiment in which each GPU renders portions (e.g., lines) of frames with each GPU rendering different portions of the same frame than the other GPU, with one of the GPUs receiving lines via DMA from the other GPU(s);

FIG. 11 is a flow chart of example logic of a shared memory embodiment in which each GPU renders portions (e.g., lines) of frames with each GPU rendering different portions of the same frame than the other GPU;

FIG. 12 is a flow chart of example logic for controlling video output using a single GPU connected to a HDMI port;

FIG. 13 is a flow chart of example logic for controlling video output using a multiplexer; and FIG. 14 is a block diagram associated with FIG. 13.

DETAILED DESCRIPTION

Figure 1:
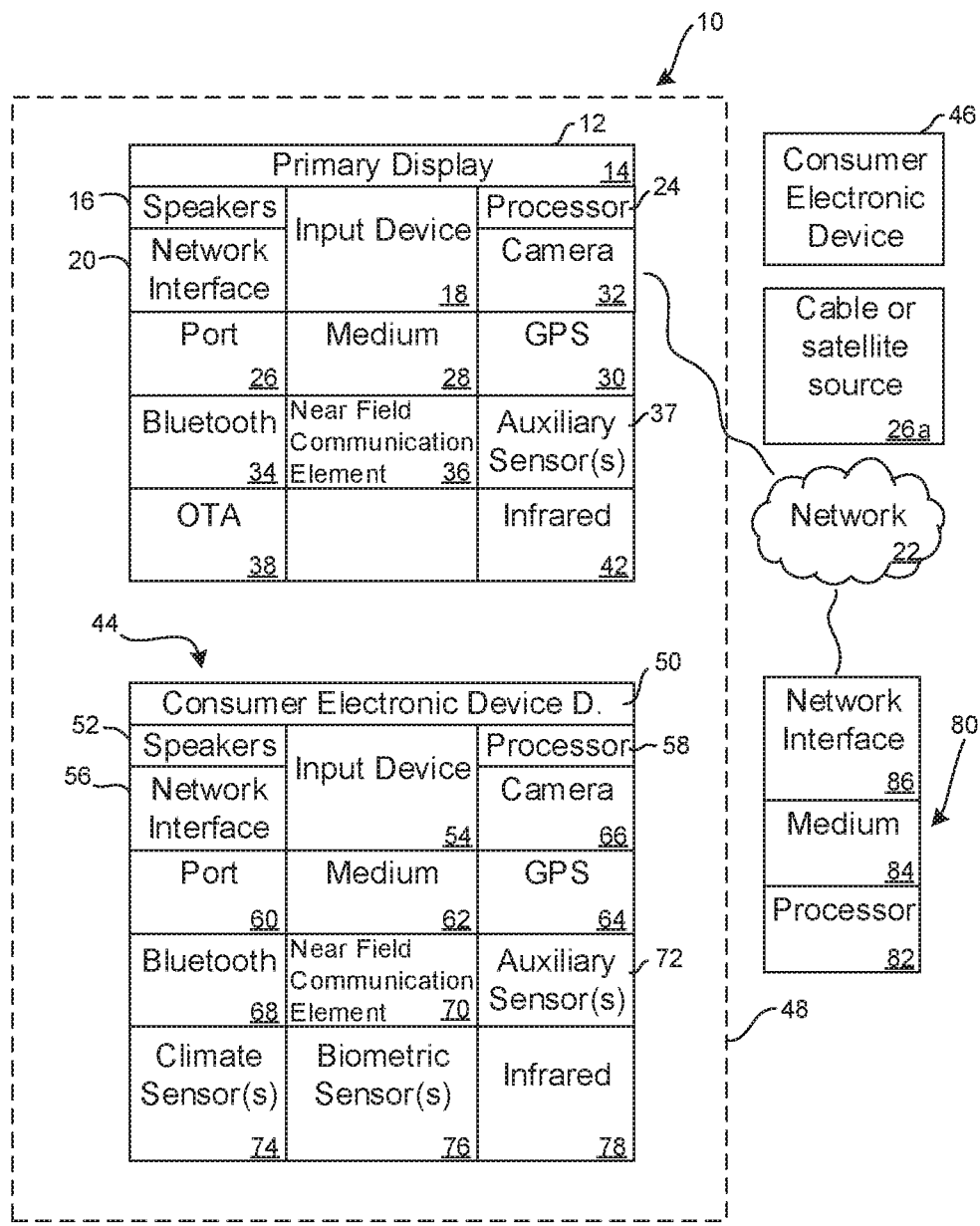
FIG. 1 is a block diagram of an example system including an example in accordance with present principles.

This disclosure relates generally to computer ecosystems including aspects of consumer electronics (CE) device networks such as but not limited to distributed computer game networks, video broadcasting, content delivery networks, virtual machines, and machine learning applications. A system herein may include server and client components, connected over a network such that data may be exchanged between the client and server components. The client components may include one or more computing devices including game consoles such as Sony PlayStation® and related motherboards, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console and/or one or more motherboards thereof such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A. B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 such as one or more central processing units (CPUs), graphics processing units (GPUs), and combinations thereof. Note that a processing chip on a single die acting as a central processing unit (CPU) and graphics processing unit (GPU) may be referred to herein as an accelerated processing unit (APU).

The interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTH TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used. As alluded to above, the CE device 44/46 and/or the source 26a may be implemented by a game console. Or, one or more of the CE devices 44/46 may be implemented by devices sold under the trademarks Google Chromecast, Roku, Amazon FireTV.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVD 12, or it may be a more sophisticated device such as a tablet computer, a game controller communicating via wired or wireless link with a game console implemented by the second CE device 46 and controlling video game presentation on the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58 such as one or more CPUs, GPUs, and combinations thereof. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage. In an implementation, the medium 84 includes one or more SSDs. The server also includes at least one network interface 86 that allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver. The network interface 86 may be a remote direct memory access (RDMA) interface that directly connects the medium 84 to a network such as a so-called "fabric" without passing through the server processor 82. The network may include an Ethernet network and/or Fibre Channel network and/or InfiniBand network. Typically, the server 80 includes multiple processors in multiple computers referred to as "blades" that may be arranged in a physical server "stack".

Accordingly, in some embodiments the server 80 may be an Internet server or an entire "server farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
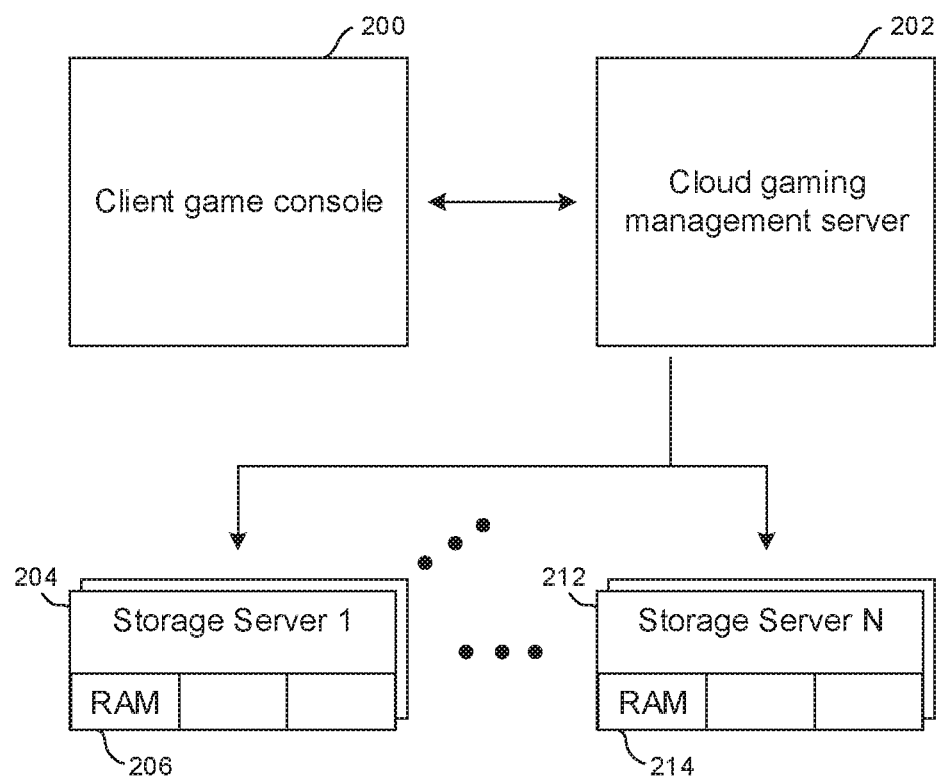
FIG. 2 is a schematic diagram of a cloud-based gaming system.

FIG. 2 illustrates an example application in the form of a cloud computer game environment in which one or more client game consoles 200 (also referred to as "game systems", "game devices") such as Sony PlayStation®, Microsoft Xboxes®, etc. communicate over a wired and/or wireless link with a cloud-based gaming management server 202, typically an Internet server. In turn, the management server 202 communicates with a first game server 204 (which may be embodied by multiple server "blades") that includes one or more solid state memories 206 such as a random-access memory (RAM) including NVMe-enabled SSDs that use solid state memory such as but not limited to flash or 3D Xpoint. The management server 202 communicates with up to "N" such servers, including an $N^{th}$ game server 212 that includes one or more solid state memories 214.

Example Architectures

FIG. 3 illustrates an example non-uniform memory access (NUMA) architecture, in which a single fabric 300 holds two APUs 302, 304 on a single die or on respective dies, it being understood that the NUMA architecture may be implemented by more than two APUs. When implemented on respective die chips on the same fabric 300, communication paths, which may be referred to as "busses" for generality, may be established by via layers of the fabric.

As shown, each APU may include one or more CPUs 304 and one or more GPUs 306, typically one CPU and one GPU per APU. Each APU 302 may be associated with its own respective memory controller 308 that controls access to memory 310 such as random-access memory (RAM). Communication between APUs may be affected by one or more communication paths 312, referred to herein for convenience as "busses".

Thus, each APU (or individual GPU) has its own memory controller and hence its own dedicated memory, such as RAM. There can be a (cache-coherent) shared bus between the GPUs, allowing one GPU to access memory of the other GPU.

FIG. 4 is a block diagram of a shared memory architecture in which two APUs each including a CPU 400 and GPU 402 are shown with each CPU and each GPU being implemented on its own respective die, it being understood that the architecture may be implemented on fewer or even one die and that more than two APUs may be implemented.

The APUs share a common memory controller 404 that controls a memory 406, and the APUs may communicate with each other and with the memory controller over respective communication paths.

FIG. 5 is a block diagram of a shared memory architecture in which two APUs (each including a respective CPU 502 and GPU 504) are shown with each APU being implemented on its own respective die 500 and with a shared memory controller 506 being implemented on one of the dies 500, it being understood that the architecture may be implemented on one die and that more than two APUs may be implemented. The shared memory controller 506 controls access to a memory 508, and the APUs may communicate with each other and with the memory controller 506 over one or more communication paths 510.

Figure 6:
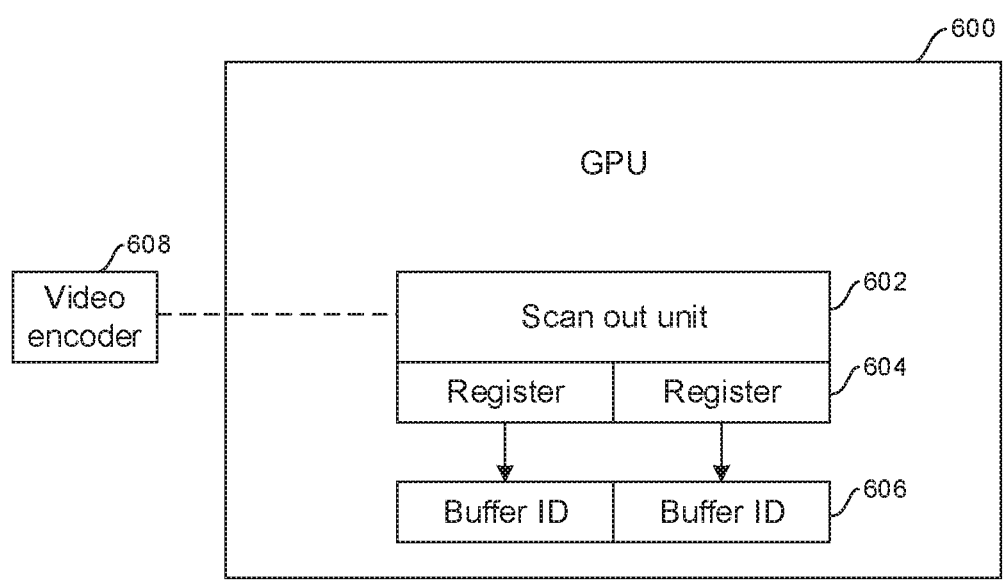
FIG. 6 is a block diagram of an example GPU with scanout unit.

FIG. 6 is a block diagram of an example GPU 600 with a scanout unit 602. The scanout unit 602 can include plural registers 604 that point to respective memory buffers (or equivalently buffer IDs) 606. A video encoder 608 may communicate with the scanout unit 602. The video encoder 608 is particularly applicable to a cloud gaming scenario for allowing encoding of the same image as would normally have been output on HDMI.

The scanout unit 602 is responsible for outputting the pixels of each frame of video, line by line, for example to HDMI. As more fully discussed below, the scanout unit can be programmed to read the correct video frame. It maintains the set of registers 604 for this, with each register pointing to a different buffer 606 and with the scanout unit cycling through the buffers.

Frame Buffer Management

As will be presently discussed more fully, there are multiple approaches on how multiple GPUs work together to manage frame buffers. Each GPU may render a different frame of the video than the other GPU. Or, each GPU may render a different part of the same frame, e.g., the top 1 through N lines of a frame may be rendered by the first GPU and the bottom N+1 through M lines of the same frame may be rendered by the second GPU. Other patterns/portions between the GPUs may be used.

FIG. 7 is a flow chart of example logic of a NUMA embodiment in which each GPU renders complete frames with each GPU rendering different frames of the same video than the other GPU, with one of the GPUs having registers pointing to buffers of the other GPU(s). Commencing at block 700, the operating system and/or GPU drivers assign memory regions to be used as a framebuffer. Typically, a framebuffer consists of at least two buffers (more add latency). One buffer is used for the currently displayed frame to be output, e.g., over HDMI, while a second buffer can be used for rendering of the next frame. There can be additional depth buffers and other buffers if desired.

In FIG. 7, the GPU driver and/or simulation program (e.g., computer game) sends rendering commands to alternate between the GPUs. The GPU driver or game manages this by commanding the first GPU to render every odd-numbered frame and the second GPU to render every even-numbered frame.

In such an implementation, the logic may move to block 702 to program the registers of the scanout unit such that each register points to a memory buffer managed by a different GPU. Proceeding to block 704, the GPU cycles through the buffers it manages and those managed by other GPUs as pointed to by the registers of the cycling GPU to output all the frames of the video, which may be in HDMI. It is to be appreciated that when more than two GPUs are used, the number of frames rendered by each GPU may be reduced accordingly, e.g., each of N GPUs may render 1-N frames of a video with each GPU rendering different frames than are rendered by the other GPUs.

FIG. 8 illustrates an alternate approach in which the scanout unit only scans frames out from the "local" GPU its memory. As was the case in FIG. 7, at block 800 in FIG. 8 the operating system and/or GPU drivers assign memory regions to be used as a framebuffer. Moving to block 802, however, the registers of the first GPU are programmed to point only to buffers local to that GPU, with frames from the second GPU being copied over via direct memory access (DMA) to the first GPU upon completion of rendering of the frames at block 804. Note that the "first" GPU may be established by the first GPU which copies the frame based on an interrupt (to notify frame completion) from the second GPU. Proceeding to block 806, the first GPU cycles through the buffers it manages, and the frames received via DMA at block 804 from the second GPU to output all the frames of the video, which may be in HDMI.

Note that in a shared memory controller architecture such as those shown in FIGS. 4 and 5, there is no need to copy frames over as there is no issue for the scanout unit to read the data. The timing is the same no matter which GPU rendered it.

FIG. 9 is a flow chart of example logic of a NUMA embodiment in which each GPU renders portions (e.g., lines) of frames with each GPU rendering different portions of the same frame than the other GPU. Commencing at block 900, a first GPU renders a first portion of a frame, such as the first N lines (lines 1 through N) while at block 902 the second GPU renders a different portion of the same frame, for example, lines N+1 through M (the last line). It is to be appreciated that when more than two GPUs are used, the portions of a frame rendered by each GPU is reduced accordingly. In any case, at block 904 the complete frame (lines 1 through M) is output by the first GPU.

To affect the above, the scanout unit can be modified to reading from multiple buffers per frame, each managed by a different GPU. The scanout unit may thus be programmed to generate the first "N" lines from a first buffer (which may be to its own internal rendering), and the next N lines from a second buffer, which may that associated with the second GPU.

FIG. 10 illustrates another alternate approach similar to that of FIG. 9 except that the second GPU DMA's memory over to a portion of the first GPU its video buffers. Accordingly, at block 1000, a first GPU renders a first portion of a frame, such as the first N lines (lines 1 through N) while at block 1002 the first GPU receives via DMA from the second GPU a different portion of the same frame, for example, lines N+1 through M (the last line). At block 1004 the complete frame (lines 1 through M) is output by the first GPU.

FIG. 11 is a flow chart of example logic of a shared memory embodiment in which each GPU renders portions (e.g., lines) of frames with each GPU rendering different portions of the same frame than the other GPU. Thus, at block 1100 the first GPU renders the first portion of a frame to a buffer, and at block 1102 the second GPU renders the second portion of the same frame to the same buffer. At block 1104 the complete frame (lines 1 through M) is output by the shared buffer.

Determining which GPU Controls HDMI Output

FIG. 12 illustrates that a first approach to determining which GPU manages the output includes, at block 1200, simply physically connecting, at manufacture time, the HDMI (or DisplayPort) output to a particular GPU. The mapping is thus controlled at manufacturing time.

FIGS. 13 and 14 illustrate that in another approach, at block 1300 in FIG. 13 each GPU 1400 (shown in FIG. 14) is implemented with its own respective video output. The outputs of the GPUs 1400 are multiplexed at block 1302 by one or more multiplexers 1402 that toggles between both GPU output ports.

Recognizing that signals are often encrypted, an encryption chip 1404 may be provided to receive the output of the multiplexer 1402 to address encryption. Essentially, the multiplexed output may establish a DisplayPort signal that is converted by the encryption chip 1404 to HDMI.

Video Composition

As understood herein, user experience (UX) graphics and simulation (e.g., game) video can both be rendered across the different GPUs. Given that UX rendering typically is not demanding, only a single GPU need render the UX, typically the GPU that is selected for also handling the HDMI output in the preceding section. This GPU composes the final frame buffer image to contain the UX and the game. The game, its framebuffer, may depend on the frame. The composition engine may read memory directly from the memory of each GPU or from the shared memory controller.

Power Management

Power management techniques may be implemented to lower thermal loads by restricting power consumption. Recognizing that power consumption varies linearly with frequency and as the square of the voltage, a computer simulation program such as a video game may be programmed to be responsible for maintaining power consumption within predetermined thresholds by reducing frequency and/or voltage automatically as frequency/voltage/power thresholds are approached. To do this, registers from the hardware such as one or more GPUs may be read to determine current usage allocation, throttling certain effects such as particle effects if needed. The same principles can apply to mobile telephones as well. Throttling may be implemented by over clock techniques, and GPUs may be throttled independently of CPUs in the architecture. Resolution of video may be reduced to maintain simulation execution while staying within power consumption-related thresholds. Audio and/or visual warnings (such as activating an LED) may be presented as power consumption-related thresholds are approached.

Users may be permitted to pay extra for additional thermal budgets. Similarly, a user may be allocated more dies (and hence more APUs) on a cloud server by paying extra fees, with only a single die being allocated to lower-paying users. This may be done when an application starts by programming an API to call for system metrics and spawn threads and determine quality of service based on the metrics. System metrics can be filtered for lower-paying users who are allocated for fewer dies. Higher-paying users desiring the benefit of a multi-threaded game with simultaneous processing can be allocated more dies than lower-paying users.

It will be appreciated that whilst present principals have been described with reference to some example embodiments, these are not intended to be limiting, and that various alternative arrangements may be used to implement the subject matter claimed herein.

What is claimed is:

1. An apparatus comprising:
   at least a first graphics processing unit (GPU);
   at least a second GPU communicatively coupled to the first GPU;
   wherein the GPUs are programmed to:
   render respective portions of video, such that the first GPU renders first portions of video and the second GPU renders second portions of the video, the first and second portions being different from each other;
   at least one scanout unit communicating with the first GPU, the scanout unit comprising plural registers that point to respective memory buffers, the memory buffers being managed by at least one of the GPUs, with each register of the scanout unit pointing to a different memory buffer to enable the scanout unit to cycle through the memory buffers.

2. The apparatus of claim 1, wherein the first and second GPUs are implemented on a common die.

3. The apparatus of claim 1, wherein the first and second GPUs are implemented on respective first and second dies.

4. The apparatus of claim 1, wherein the first GPU is associated with a first central processing unit (CPU) and the second GPU is associated with a second CPU.

5. The apparatus of claim 1, comprising a first memory controller and first memory associated with the first GPU and a second memory controller and second memory associated with the second GPU.

6. The apparatus of claim 1, wherein the GPUs share a common memory controller controlling a common memory and the GPUs communicate with no memory controller other than the common memory controller.

7. The apparatus of claim 6, wherein the scanout unit points to at least a first buffer communicating with the common memory controller, the second GPU comprises a second buffer communicating with the common memory controller, the first GPU rendering 1-N lines associated with the first buffer and the second GPU rendering (N+1)-M lines associated with the second buffer, the 1-N lines and (N+1)-M lines being different lines of the frame of video.

8. The apparatus of claim 1, wherein each GPU is programmed to render all of some, but not all, frames of video different from frames of the video rendered by the other GPU to provide a respective output, the outputs of the GPUs for being combined to render the video.

9. The apparatus of claim 8, wherein the scanout unit points only to buffers managed by the first GPU, the first GPU programmed to receive frames of the video from the second GPU via direct memory access (DMA) and output a complete sequence of frames of the video.

10. The apparatus of claim 1, wherein each GPU is programmed to render all of some, but not all, lines of a frame of video, lines of a frame of video rendered by a GPU being different from lines of the frame rendered by the other GPU to provide a respective output, the outputs of the GPUs for being combined to render the video.

11. The apparatus of claim 1, wherein the scanout unit points to at least one buffer managed by the second GPU, the first GPU programmed to cycle through buffers to output a complete sequence of frames of the video.

12. The apparatus of claim 1, wherein the scanout unit points to at least a first buffer managed by the first GPU and a second buffer managed by the second GPU, the first GPU programmed to cycle through buffers to output a complete sequence of frame of video using 1-N lines associated with the first buffer and (N+1)-M lines associated with the second buffer, the 1-N lines and (N+1)-M lines being different lines of the frame of video.

13. The apparatus of claim 1, wherein the scanout unit points to at least a first buffer managed by the first GPU and not to a second buffer managed by the second GPU, the first GPU programmed to cycle through buffers to output a complete sequence of frame of video using 1-N lines associated with the first buffer and (N+1)-M lines associated with the second buffer and received by the first GPU via direct memory access (DMA), the 1-N lines and (N+1)-M lines being different lines of the frame of video.

14. The apparatus of claim 1, wherein the first GPU manages video data output from the first and second GPUs.

15. The apparatus of claim 1, wherein the GPUs output video data to a multiplexer that multiplexes the frames and/or lines from the respective GPUs together to output video.

* * * * *